United States Patent
Good et al.

(10) Patent No.: US 7,600,188 B2
(45) Date of Patent: Oct. 6, 2009

(54) INTERFACE FOR DIRECTING A USER TO BUILD A WEBSITE

(75) Inventors: Frederick L. Good, Cambridge, MA (US); Thuy Tu Pham, Norwood, MA (US); Craig Stuber, Kennsington, NH (US); Tony Pham, Pelham, NH (US)

(73) Assignee: Glogood, Inc., Cambridge, MA (US)

( * ) Notice: Subject to any disclaimer, the term of this patent is extended or adjusted under 35 U.S.C. 154(b) by 153 days.

(21) Appl. No.: 11/453,151

(22) Filed: Jun. 15, 2006

(65) Prior Publication Data

US 2007/0294628 A1    Dec. 20, 2007

(51) Int. Cl.
G06F 3/00  (2006.01)
G06F 9/44  (2006.01)

(52) U.S. Cl. .................. 715/762; 715/708; 717/109

(58) Field of Classification Search .............. 715/760, 715/762, 763, 234, 235, 708, 705; 717/109, 717/100
See application file for complete search history.

(56) References Cited

U.S. PATENT DOCUMENTS

| | | | |
|---|---|---|---|
| 4,768,144 A | 8/1988 | Winter et al. | |
| 5,500,936 A | 3/1996 | Allen et al. | |
| 6,145,000 A | 11/2000 | Stuckman et al. | |
| 6,151,630 A | 11/2000 | Williams | |
| 6,185,587 B1 | 2/2001 | Bernardo | |
| 6,405,238 B1 | 6/2002 | Votipka | |
| 6,411,999 B1 | 6/2002 | Tinkler | |
| 6,486,895 B1 | 11/2002 | Robertson et al. | |
| 6,556,217 B1 | 4/2003 | Makipaa | |
| 6,601,057 B1 * | 7/2003 | Underwood et al. ........... 707/1 |
| 6,819,340 B2 * | 11/2004 | Burke ........................ 715/738 |
| 7,152,207 B1 * | 12/2006 | Underwood et al. ........ 715/207 |
| 2001/0037258 A1 | 11/2001 | Barritz | |
| 2002/0120644 A1 | 8/2002 | Roberts | |
| 2002/0158902 A1 * | 10/2002 | Hooker et al. .............. 345/744 |
| 2003/0018665 A1 | 1/2003 | Dovin | |
| 2003/0126558 A1 | 7/2003 | Griffin | |
| 2003/0145275 A1 | 7/2003 | Qian | |
| 2003/0160814 A1 | 8/2003 | Brown | |
| 2003/0172350 A1 | 9/2003 | Reed | |
| 2003/0217076 A1 | 11/2003 | Heptinstall | |
| 2004/0027391 A1 | 2/2004 | Tu | |
| 2004/0036719 A1 * | 2/2004 | Van Treeck ................. 345/763 |
| 2004/0068698 A1 | 4/2004 | Wu | |
| 2004/0123244 A1 | 6/2004 | Campbell | |

(Continued)

OTHER PUBLICATIONS

Walsh, A Technical Introduction to XML, www.xml.com/lpt/a/98/10/guide0.html, Feb. 1998.

(Continued)

*Primary Examiner*—Ting Zhou
(74) *Attorney, Agent, or Firm*—Kramer & Amado, PC

(57) ABSTRACT

An interface directs a user to build a website. A first interface element directs the user to create an account. A second interface element directs the user to create a home page. A third interface element directs the user to create a directory. A fourth interface element directs the user to create at least one site page. A designator indicates to the user at least one of the first, second, third, and fourth interface elements to select in order to build the website.

20 Claims, 12 Drawing Sheets

U.S. PATENT DOCUMENTS

2004/0125128 A1   7/2004   Change et al.
2004/0205464 A1   10/2004  Bates
2004/0205587 A1   10/2004  Draper
2005/0039133 A1   2/2005   Wells et al.
2006/0078859 A1*  4/2006   Mullin ....................... 434/219

OTHER PUBLICATIONS

WebSite Tonight Users Guide, Version 2.2 Mar. 2004, Starfield Technologies.

* cited by examiner

INTERFACE FOR DIRECTING A USER TO BUILD A WEBSITE

BACKGROUND

The Internet today includes millions of web sites hosted on servers around the world. Each web site consists of various pages, related or not, that are linked together in various manners to other pages within the same site or to other sites. Web sites are created for distributing information, advertising, selling or buying goods and services, and expressing ones' creative nature.

Web sites may be created using simple text editing software. This 'do-it-yourself' development environment requires the designer to know a plethora of hypertext markup language symbols and techniques that are beyond the skill and interests of an average computer user.

Websites may also be created using more sophisticated web designing tools. This component development environment provides the professional designer with the ability to create complex websites. These website might require the integration of modules for ecommerce, data entry, web statistics, site security, video, downloads and others. To further complicate matters, the professional must also deal with website support services such as hosting, domain name, bandwidth, storage and email.

These two web designing approaches are mastered through lots of training and skill. These website building tools are geared towards power users and fundamentally fail to guide a user through the simplest of tasks.

What is needed is a process to allow users to simply and easily create and publish a new website without overwhelming the user with a myriad of additional features.

SUMMARY

According to an embodiment, an interface directs a user to build a website. A first interface element directs the user to create an account. A second interface element directs the user to create a home page. A third interface element directs the user to create a directory. A fourth interface element directs the user to create at least one site page. A designator indicates to the user at least one of the first, second, third, and fourth interface elements to select in order to build the website.

BRIEF DESCRIPTION OF THE DRAWINGS

Examples of the invention are illustrated, without limitation, in the accompanying figures in which like numeral references refer to like elements, and wherein:

FIG. 10 shows a block diagram of a computer system wherein the examples may be implemented.

DETAILED DESCRIPTION

For simplicity and illustrative purposes, the principles are shown by way of examples of systems and methods described. In the following description, numerous specific details are set forth in order to provide a thorough understanding of the examples. It will be apparent however, to one of ordinary skill in the art, that the examples may be practiced without limitation to these specific details. In other instances, well known methods and structures are not described in detail so as not to unnecessarily obscure understanding of the examples.

Throughout the present disclosure, reference is made to interface elements. An interface element may be an object, control, button, link, or any graphical user interface item that may be selected or activated by a user. In one example, the interface element is a control on a window that a user activates to accept user input or display another window for accepting user input. In another example, the interface element may be a link to another page or another location on the same page wherein the user enters or selects information.

Throughout the present disclosure, reference is made to a designator. The designator may be any portion of an interface that is set apart from other portions of the interface in some manner. For instance, the designator may comprise a color different from a background color of the interface. In an example, the designator may surround or indicate to a user which interface element must be selected next in order to build a website. Additionally, the designator may contain text or graphics directing the user to take some specific action. For instance, the designator may contain instructions directing the user to select an icon and enter specific information.

In an example, an interface or program providing the interface directs a user to build a website. The interface includes interface elements for directing the user through various steps for building the website. When the user starts a program, the user is presented with a user interface including interface elements. A first interface element directs the user to create an account. A second interface element directs the user to create a home page. A third interface element directs the user to create a directory. A fourth interface element directs the user to create at least one site page. Additionally, designators may be associated with the interface elements for indicating to the user which interface element should be selected in order to accomplish the various steps.

Figure 1:
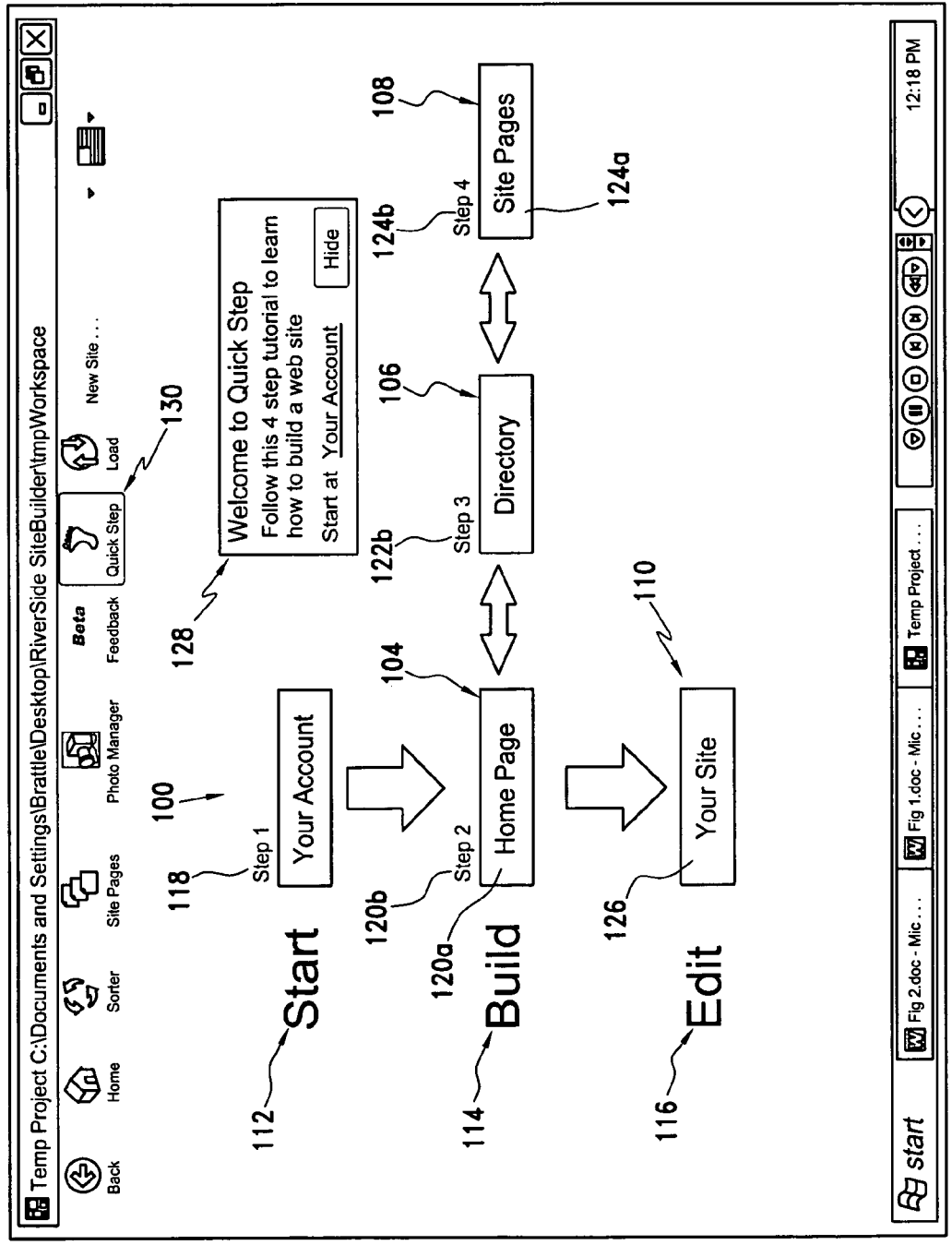
FIGS. 1 and 1A show an interface for directing a user to build a website in accordance with an example.

With reference first to FIG. 1, there is shown an interface 100 including a your account interface element 102, a home page interface element 104, a directory interface element 106, a site pages interface element 108, and a sorter interface element 110. The interface 100 also includes various designators such as a start identifier 112, a build identifier 114, and an edit identifier 116. These identifiers 112, 114, and 116 generally indicate to the user the interface elements 102, 104, 106, 108, and 110 to select in order to build the website.

Additional designators such as the highlighting 118 around the your account interface element 102 allows the user to easily determine what to do next. The highlighting 120a surrounds the home page interface element 104 and also includes labeling 120b indicating the order in which the interface elements 104, 106, and 108 should be selected. For example, the highlighting 122a is located around the directory interface element 106 and also includes labeling 122b indicating to the user that the interface element 106 is the second step in the build process. The highlighting 124a is located around the site pages interface element 108 and includes labeling 124b indicating to the user that the interface element 108 is the third step in the build process. The highlighting 126 around the sorter interface element 110 indicates to the user that the sorter interface element 110 should be selected to sort the pages in the web site. Additionally, a designator 128 provides instructions directing the user to through the process of building a website.

Figure 1A:
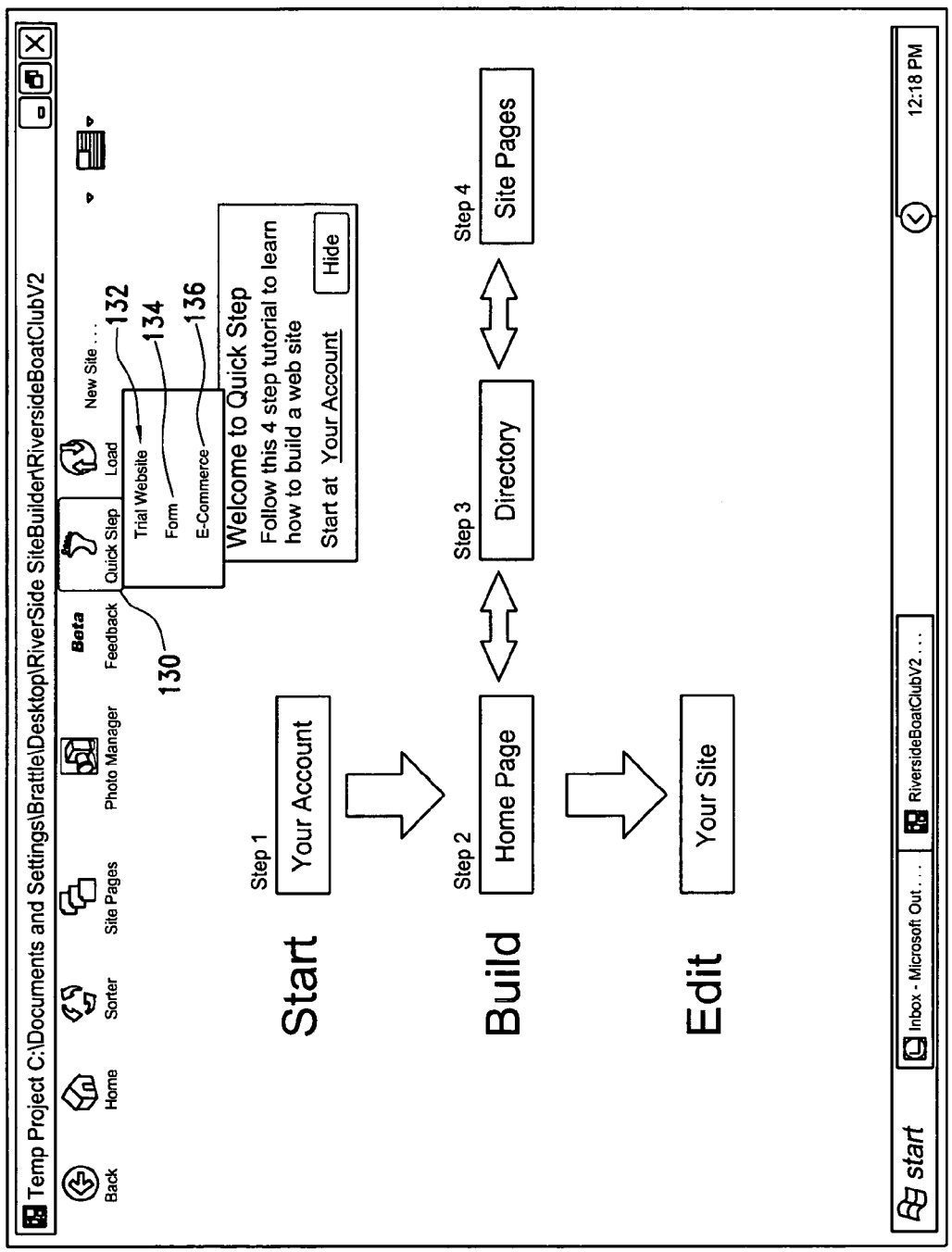

FIG. 1A shows the interface 100 with a quick step control 130 activated by the user. When the user scrolls over the quick step control 130, a pop-up or drop down menu appears allowing the user to activate or deactivate quick step for a trail website 132, a form 134, or an e-commerce page 136. Through this quick step control 130, the user may turn quick step on or off allowing the user complete control over the level of guidance for certain functions.

Figure 2:
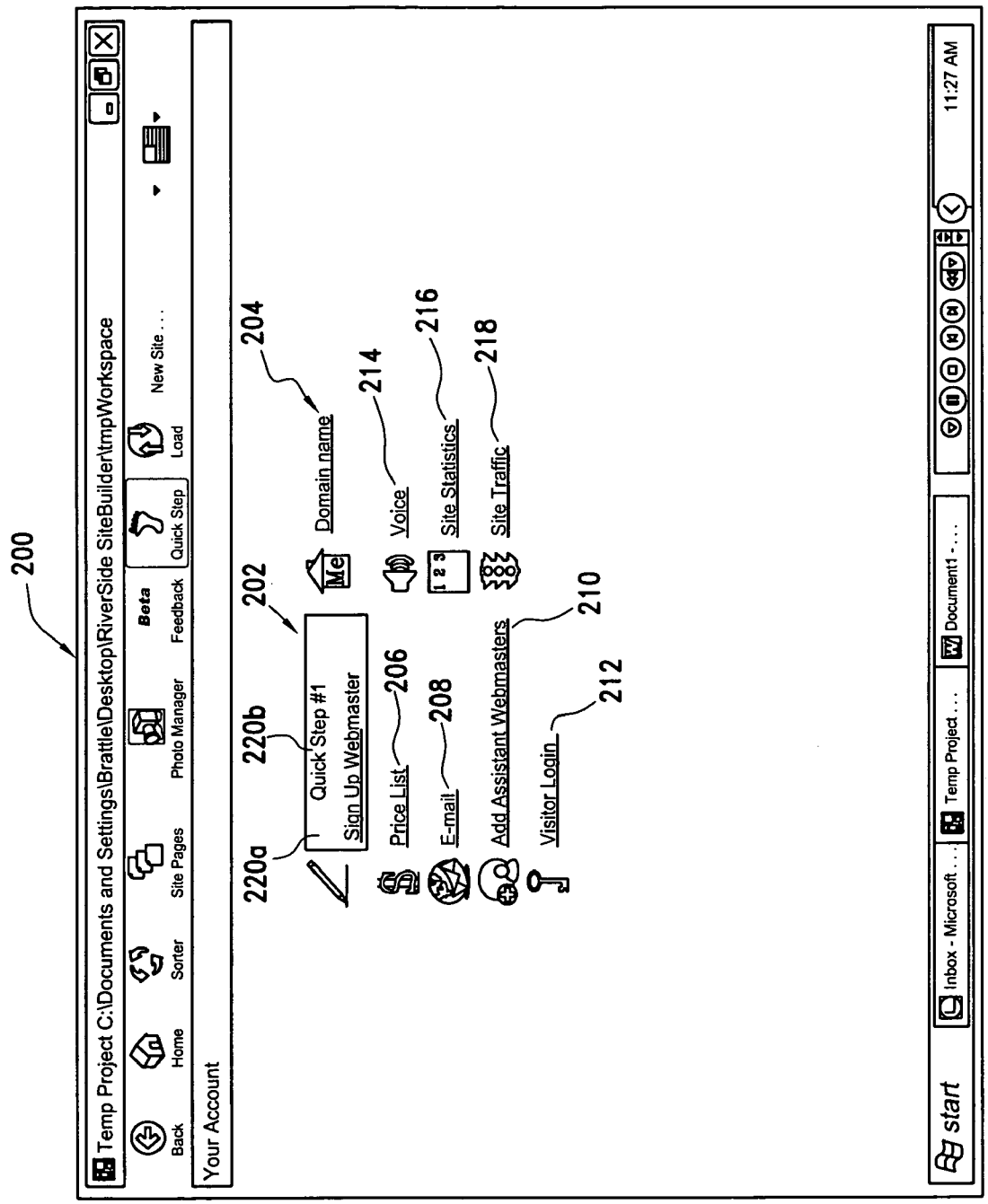
FIGS. 2 and 2A show an interface for directing a user to create an account in accordance with an example.
Figure 2A:
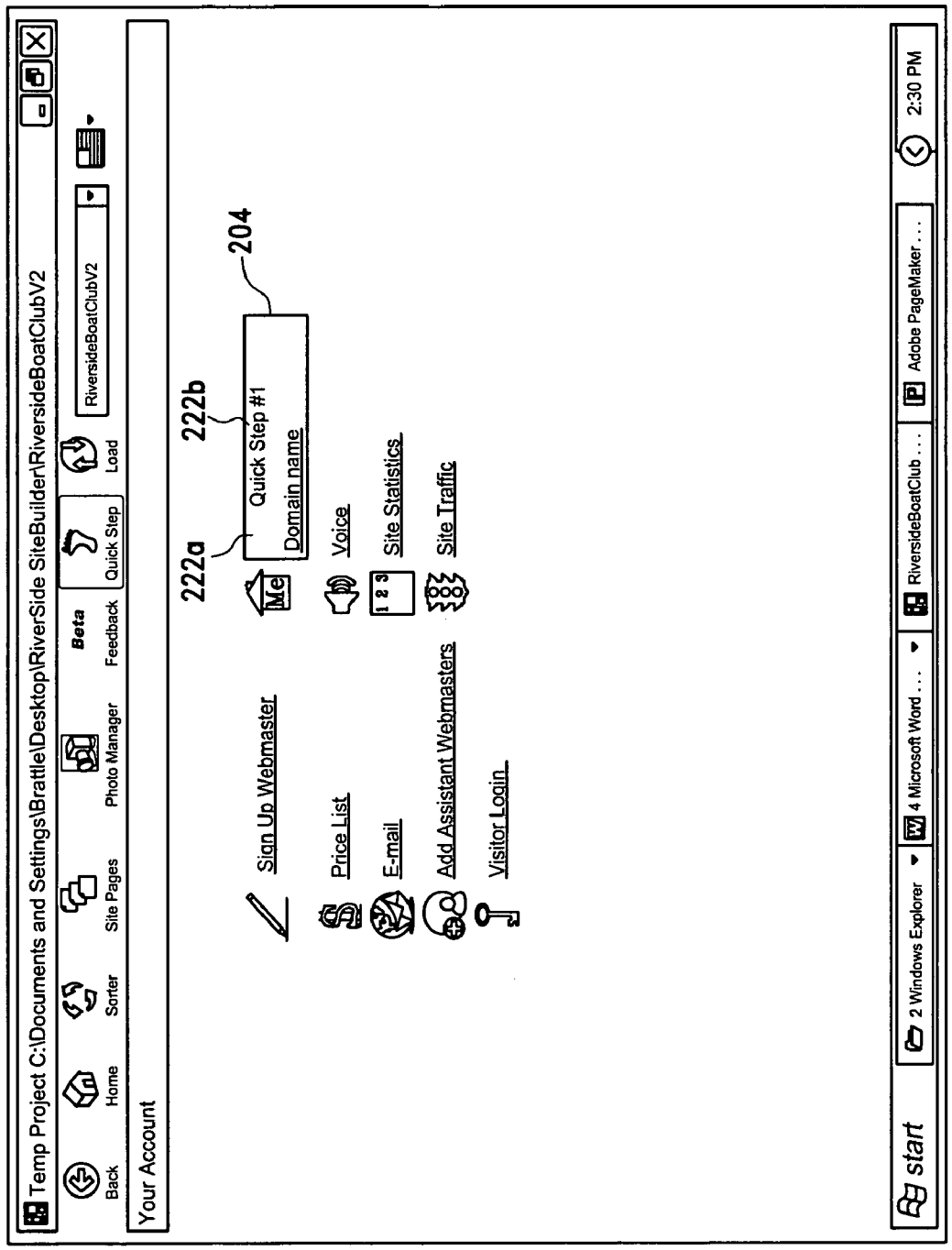

Once a user selects the your account interface element 102, the user may be presented with a set up interface 200 having a plurality of interface elements as shown in FIG. 2. The setup interface 200 includes a plurality of interface elements that are part of the basic process for building a website and other interface elements that are useful but not necessary to the basic website building process. For instance, a signup webmaster interface element 202 includes highlighting 220a with a label 220b. After the user has completed the signup webmaster step from element 202, the interface 200 changes to a configuration as shown in FIG. 2B wherein the domain name interface element 204 becomes part of the quickstep process and includes highlighting 222a with a label 222b. The other interface elements such as price list 206, e-mail 208, add assistant webmaster 210, visitor login 212, voice 214, site statistics 216, and site traffic builder 218 are not part of the basic website building process and are therefore not highlighted. In this manner, the user is presented with a plurality of options for building a website and yet the user is directed, by the highlighting, to the next proper step in building the website.

Upon selecting the signup webmaster interface element 202, the user may be prompted to enter information such as a user name, password, e-mail address, and other basic information needed for identifying or contacting the user. Upon selecting the domain name interface element 204, the user may be prompted to choose a domain name for the website. At this point, the user has created the account and may be directed back to the interface 100 for continuing staring the build 114 process as shown in FIG. 1.

Figure 3:
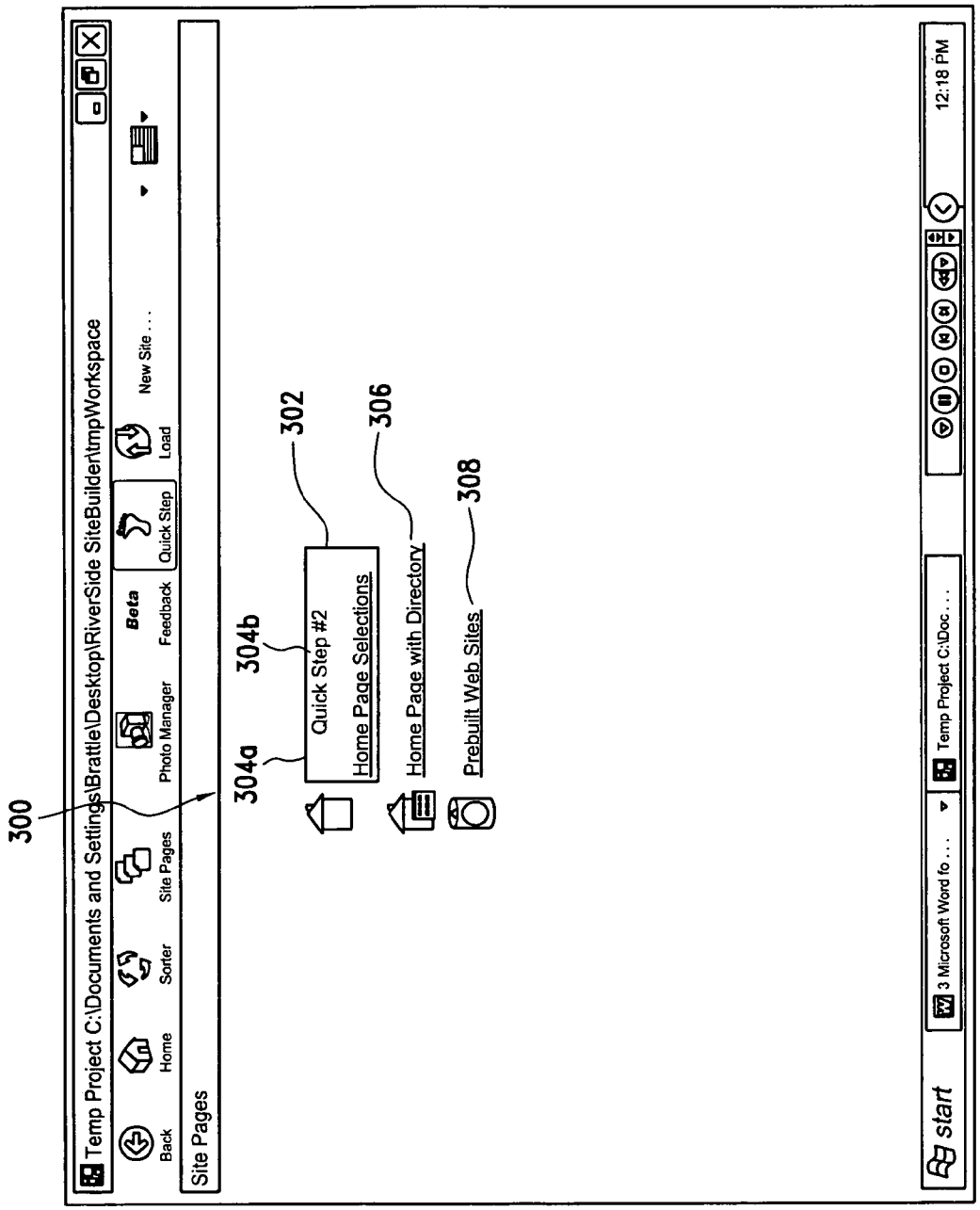
FIG. 3 shows an interface for directing a user to create a home page in accordance with an example.

Once the user selects the home page interface element 104, the user may be presented with a home page interface 300 having a plurality of interface elements as shown in FIG. 3. The home page interface 300 includes a plurality of interface elements that are part of the basic process for building a website and other interface elements that are useful but not necessary to the basic website building process. For instance, a home page selections interface element 302 is part of the basic process for building a website and as such include highlighting 304a with a label 304b. The other interface elements such as a home page with a directory interface element 306 and the prebuilt websites interface element 308 are not part of the basic website building process and are therefore not highlighted. In this manner, the user is presented with a plurality of options for building a website and yet the user is directed, by the highlighting, to the next proper step in building the website.

Figure 4:
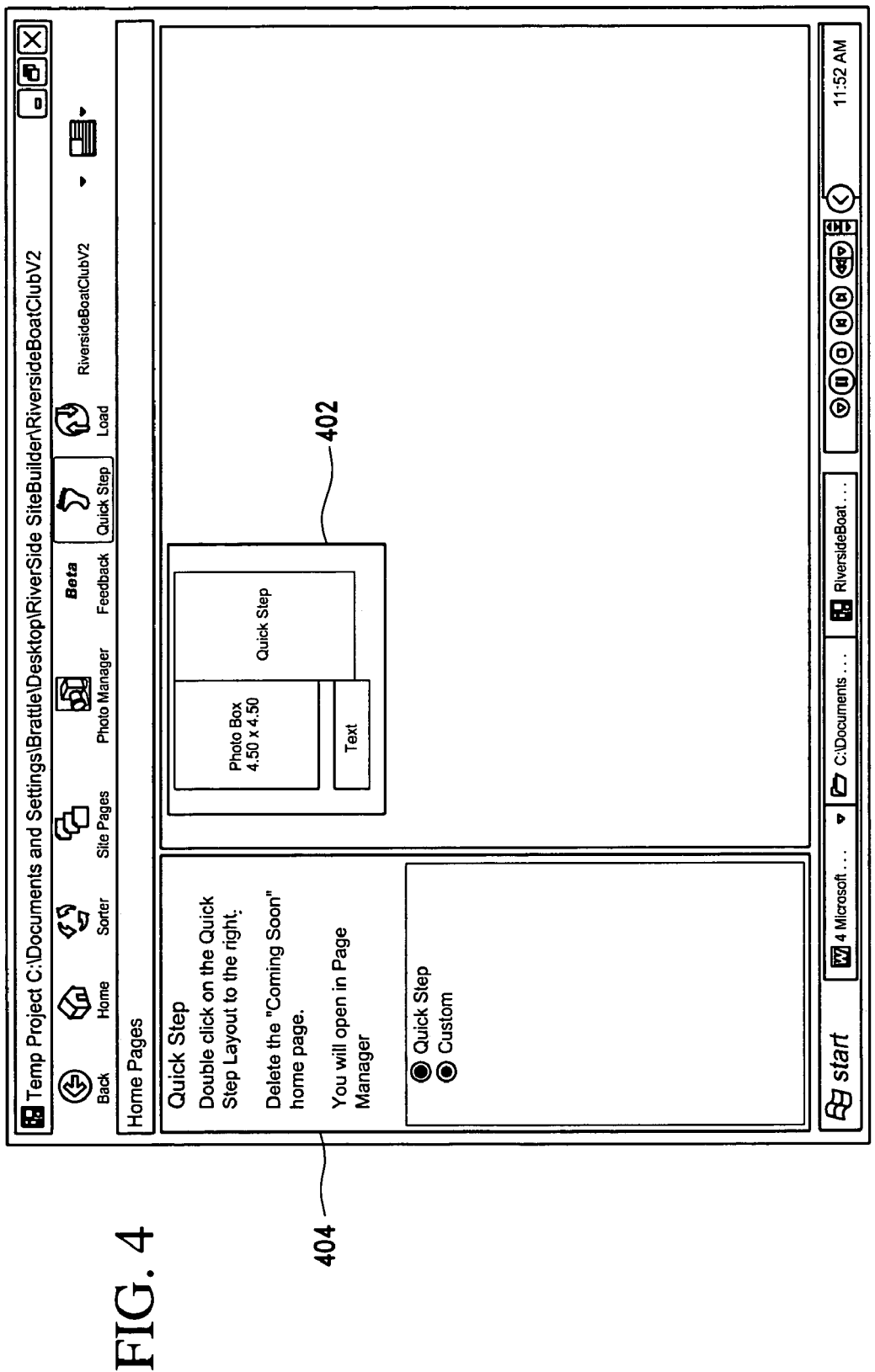
FIGS. 4 and 4A show an interface for directing a user to select a home page layout in accordance with an example.

Upon selecting the home page selections interface element 302, the user may be presented with a layout selection interface 400 for selecting a home page as shown in FIG. 4. The layout selection interface 400 includes various interface elements allowing the user to choose a type of page as the home page. The layout selection interface 400 includes a basic layout 402 and a designator 404. The designator 404 provides instructions directing the user to select the basic layout 402 in order to open a page manager to edit the basic layout.

Figure 4A:
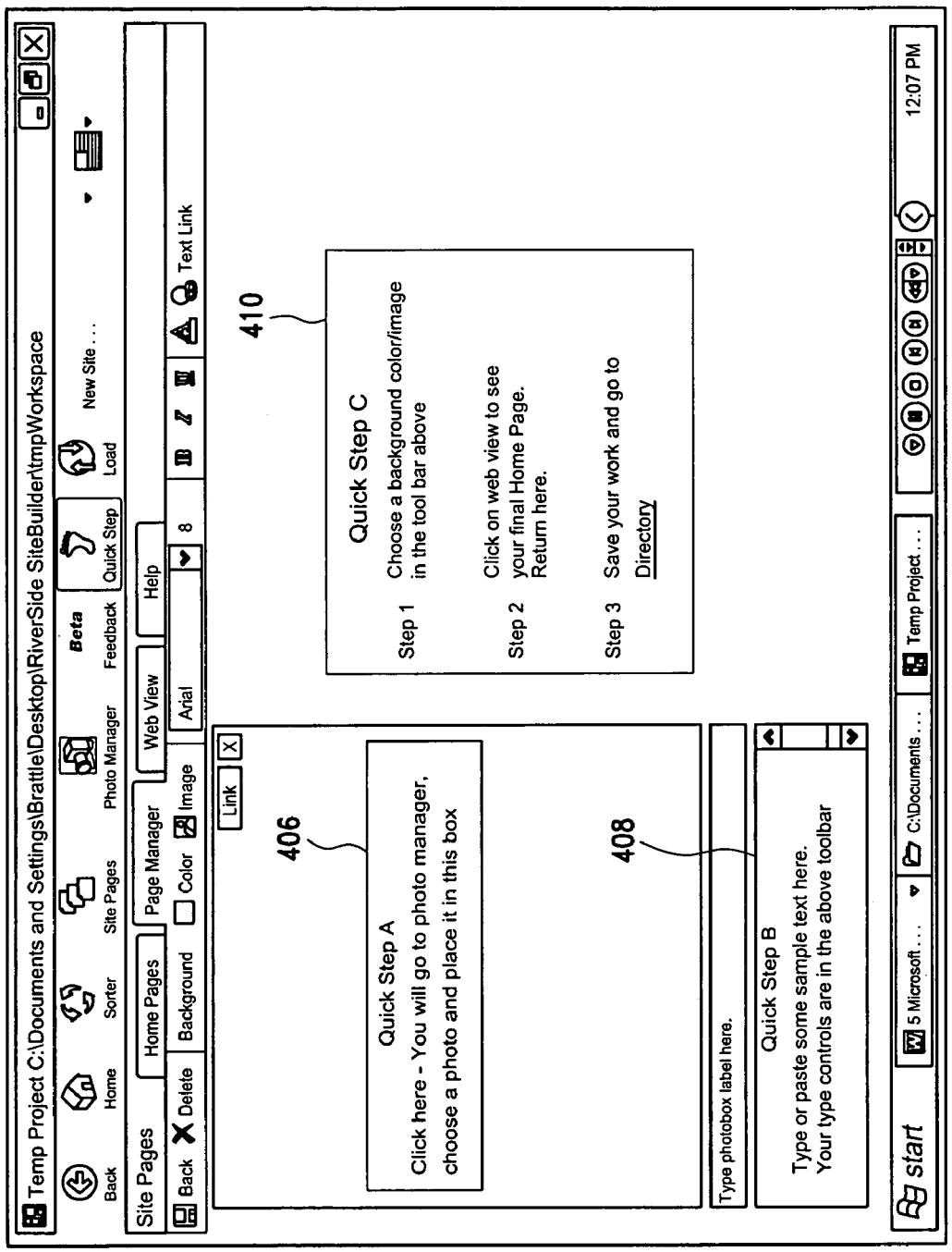

When the user selects the basic layout 402, the interface 400 changes to the configuration as shown in FIG. 4A wherein the quick step process continues to provide user direction. The quickstep processes A, B, and C, labeled 406, 408, and 410 in FIG. 4A, provide additional instruction on completing the layout selection. Once the user is done with this process, the user may be directed back to the interface 100 for continuing with the build process.

Figure 5:
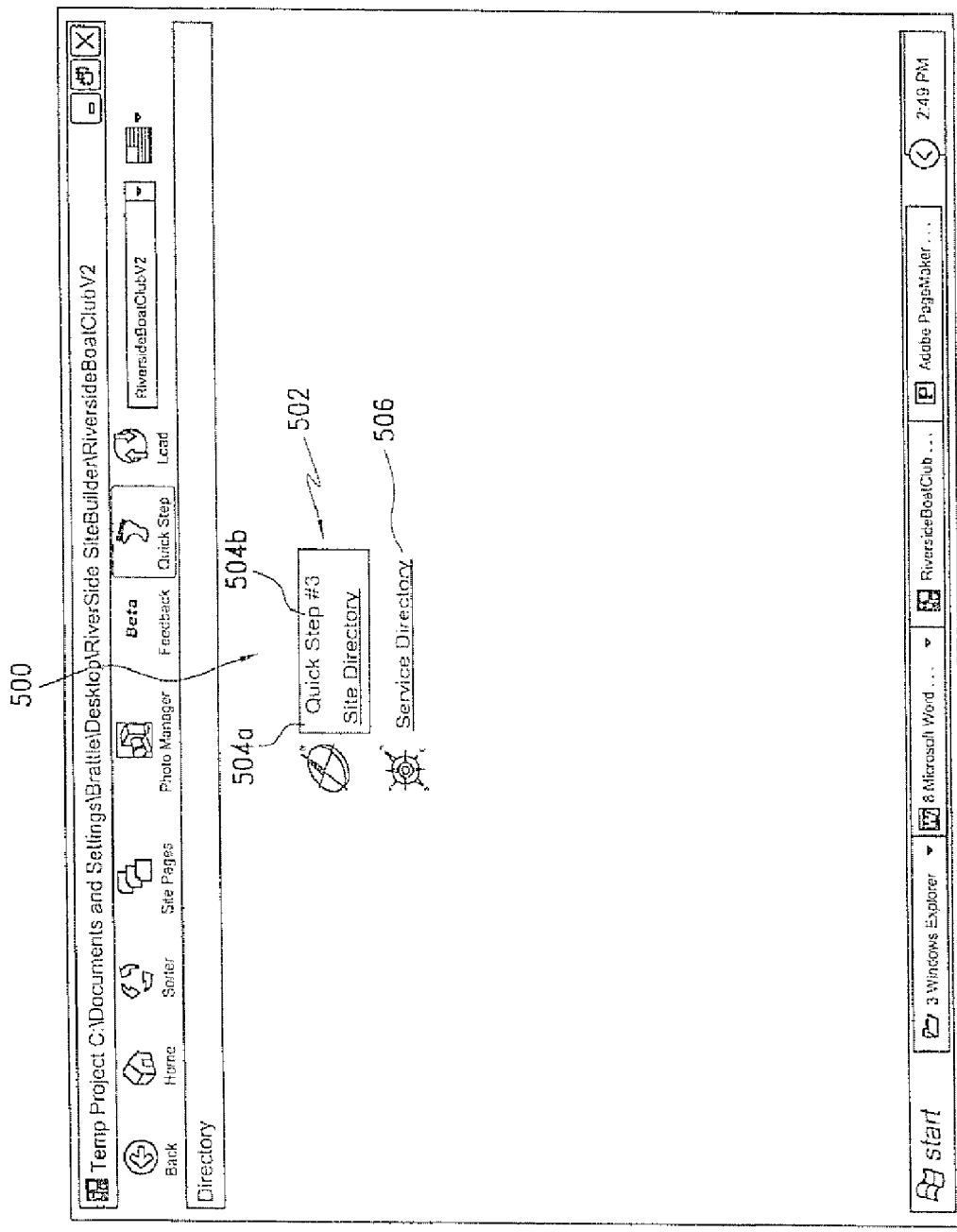
FIG. 5 shows an interface for directing a user to create a site directory in accordance with an example.

Once the user selects the directory interface element 106, the user may be presented with a directory interface 500 a plurality of interface elements as shown in FIG. 5. The directory interface 500 may include interface elements that are part of the basic process for building a website and other interface elements that are useful but not necessary to the basic website building process. For instance, a site directory interface element 502 is part of the basic process for building a website and as such includes highlighting 504a with a label 304b. The other interface element such as a service directory interface element 506 is not part of the basic website building process and is therefore not highlighted. In this manner, the user is presented with a plurality of options for building a website and yet the user is directed, by the highlighting, to the next proper step in building the website.

Figure 6:
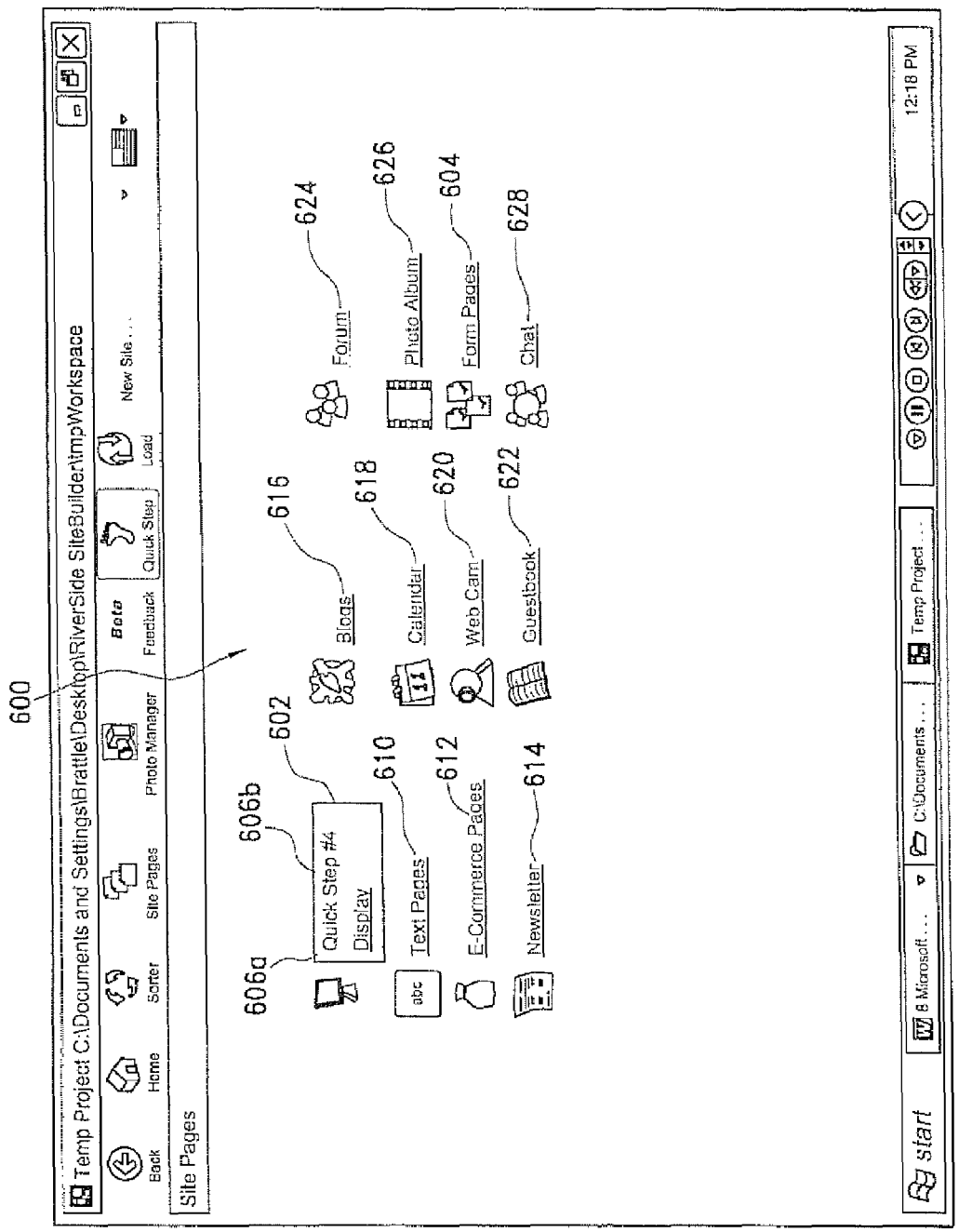
FIG. 6 shows an interface for directing a user to select display pages for a site directory in accordance with another example.

Once a user is guided through the site directory process, the user is taken back to the interface 100 for continuing with the build process. Once the user selects the site pages interface element 108, the user may be presented with a site pages interface 600 having a plurality of interface elements as shown in FIG. 6. The site pages interface 600 includes a plurality of interface elements that are part of the basic process for building a website and other interface elements that are useful but not necessary to the basic website building process. For instance, a display pages interface element 602 is part of the basic process for building a website and as such includes highlighting 606a with a label 606b. The other interface elements such as test pages 604, ecommerce 612, newsletter 614, blogs 616, calendar, 618, web cam 620, guestbook 622, forum 624, photo album 626, and chat 628 are not part of the basic website building process and are therefore not highlighted. In this manner, the user is presented with a plurality of options for building a website and yet the user is directed, by the highlighting, to the next proper step in building the website.

Figure 7:
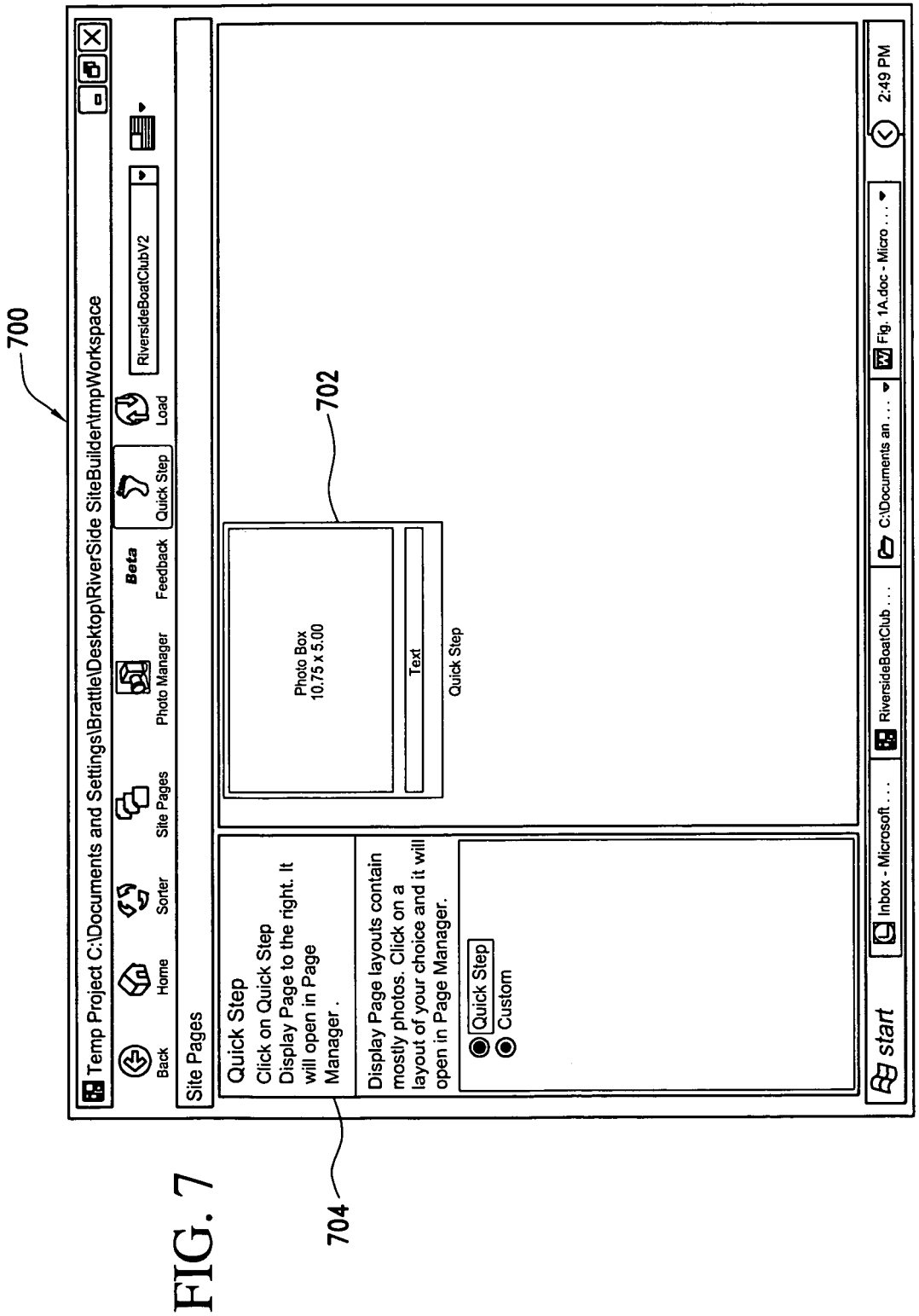
FIG. 7 shows an interface for directing a user to select a layout for a display page in accordance with another example.

Upon selecting the display pages interface element 602, the user may be presented with a display page layout selection interface 700 for selecting a page layout as shown in FIG. 7. The display page layout selection interface 700 includes various interface elements allowing the user to choose a type of page to create. The display page layout selection interface 700 includes a basic layout 702 and a designator 704. The designator 704 provides instructions directing the user to select the basic layout 702 in order to open a page manager to edit the basic layout. Once the user is done with this process, the user may be directed back to the interface 100.

At this point the user has completed the basic website building process. The interface 100 may indicate this and then direct a user to an edit process by indicating that the sorter interface element 110 should be selected.

The entire process of building the website may be labeled in a consistent manner to allow the user to easily recognize what must be done next. For instance, the basic build process may be labeled a "quick start" process and thereafter the designators may be labeled quick start 1, 2, 3, etc. in order to indicate to the user the order in which to select the interface elements. Additionally, the designators may include more detailed instructions for clarifying particular steps in the process. Once the user has created a website with the quick start process, the designators may be removed and the user is still presented with interfaces which the user is now accustomed to navigating. This process allows the user to become familiar with the interfaces and thus the user is more likely to use the website builder.

Figure 8:
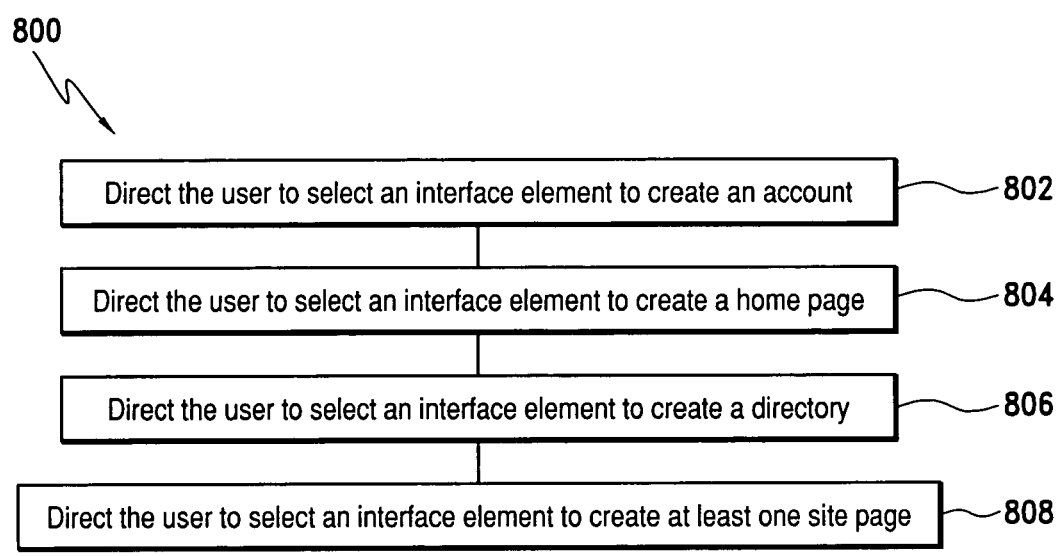
FIG. 8 shows a flow chart of steps a user is directed to select in order to build a website in accordance with an example.

FIG. 8 shows a flow diagram of a website building method 800. The following description of the method 800 is made with reference to the interface 100 illustrated in FIG. 1, and thus makes reference to the elements cited therein. The following description of the method 800 is one manner in which the user may be directed to create a website. In this respect, it is to be understood that the following description of the method 800 is but one manner of a variety of different methods in which such a user may be directed to create a website with the interface 100 shown above.

In the method 800, a user is directed through any one or more of the designators 112, 118, and 128 to select the your account interface element 102 to create an account at step 802. The user is directed through any one or more of the designators 114, 120a, 120b, and 128 to select the home page interface element 104 to create a home page at step 804. The user is directed through any one or more of the designators 114, 122a, 122b, and 128 to select the directory interface element 106 to create a directory at step 806. The user is directed through any one or more of the designators 114, 124a, 124b, and 128 to select the site pages interface element 108 to create at least one site page at step 808. The various designators 112, 114, 116, 118, 120a, 120b, 122a, 122b, 124a, 124b, 126, and 128 indicated to the user the order in which to select the interface elements 102, 104, 106, and 108 to create the website.

Figure 9:
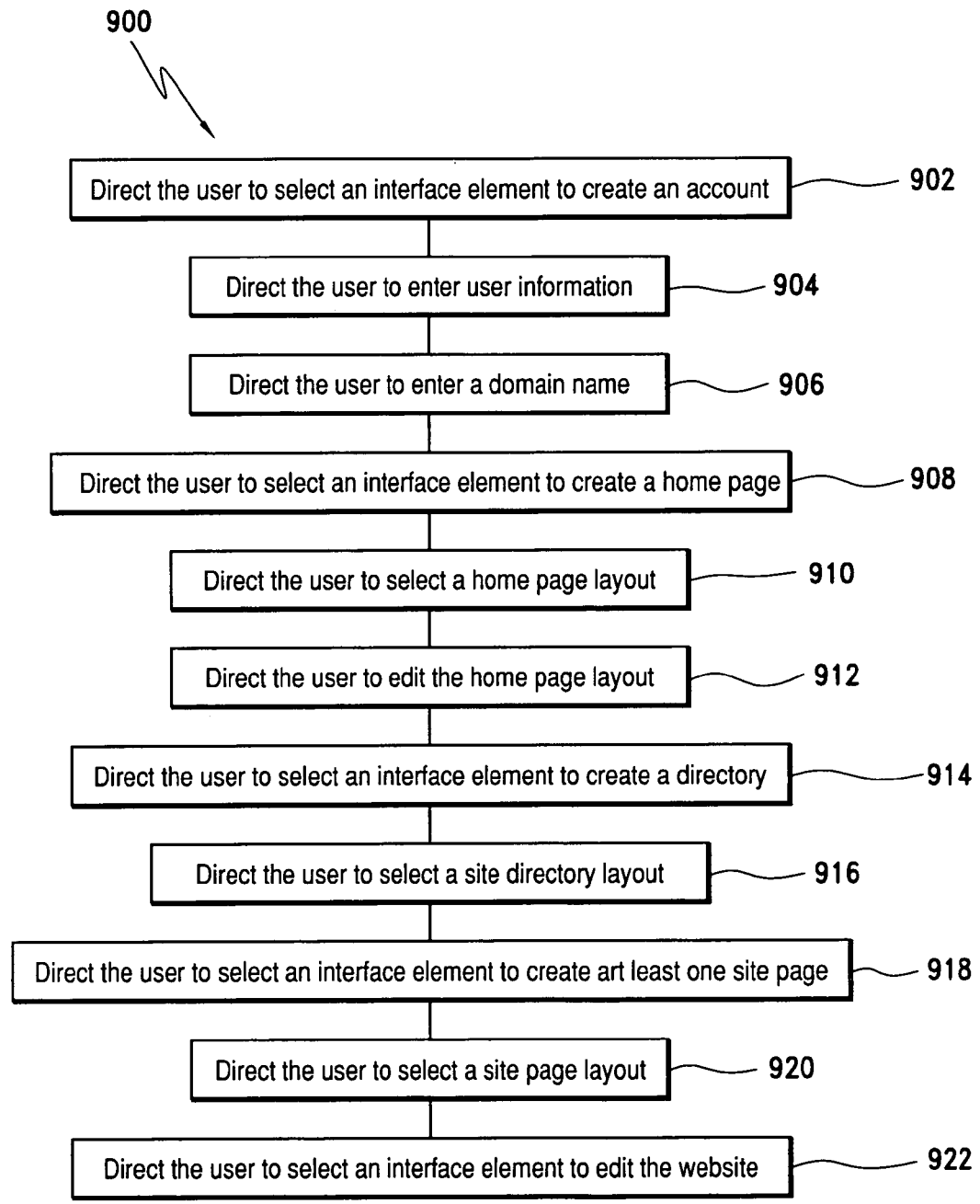
FIG. 9 shows a flow chart of steps a user is directed to select in order to build a website in accordance with another example.

FIG. 9 shows a flow diagram of a website building method 900. The following description of the method 900 is made with reference to the interfaces 100-700 illustrated in FIGS. 1-7, and thus makes reference to the elements cited therein. The following description of the method 900 is one manner in which the user may be directed to create a website. In this respect, it is to be understood that the following description of the method 900 is but one manner of a variety of different methods in which such a user may be directed to create a website with the interfaces 100-700 shown above.

In the method 900, a user is directed through any one or more of the designators 112, 118, and 128 to select the your account interface element 102 to create an account at step 902. The user is directed any one or more of the designators 220a or 220b to select the signup webmaster interface element 202 in order to enter user information at step 904. The user is directed any one or more of the designators 222a or 222b to select the domain name interface element 204 in order to select a domain name for the website at step 906.

At this point, the account is created for the user. The user is then directed through any one or more of the designators 114, 120a, 120b, and 128 to select the home page interface element 104 to create a home page at step 908. The user is directed through any one or more of the designators 304a or 304b to select the home page selections interface element 302 in order to select the layout of the home page for the website at step 910. The user is directed through the designator 404 to select the layout 402 of the home page for the website at step 912.

At this point the home page is created. The user is directed through any one or more of the designators 114, 122a, 122b, and 128 to select the directory interface element 106 to create a directory at step 914. The user is directed through any one or more of the designators 504a or 504b to select the site directory interface element 502 in order to select the site directory layout at step 916. The user is directed through any one or more of the designators 114, 124a, 124b, and 128 to select the site pages interface element 108 to create at least one site page at step 918. The user is directed through any one or more of the designators 606a, 606b, 608a, and 608b to select the display pages interface element 602 and the forms interface element 604 to create at least one display page at step 920.

At his point, the basic website has been completed. The user may then be directed through any one or more of the designators 116, 126, and 128 to edit the website at step 922.

The interfaces 100-700 and the steps illustrated in the methods 800 and 900 may be contained as a utility, program, subprogram, in any desired computer accessible medium. In addition, the interfaces 100-700 and methods 800 and 900 may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

As an example, a computer system that may implement the interfaces and the methods shown in FIGS. 1-9 includes one or more processors providing an execution platform for executing software. The processor(s) may also execute an operating system for executing the software in addition to performing operating system tasks.

The computer system also includes a main memory, such as a Random Access Memory (RAM), providing storage for executing software during runtime and mass storage. The mass storage may include a hard disk drive and/or a removable storage drive, representing a floppy diskette drive, a magnetic tape drive, a compact disk drive, or a nonvolatile memory where a copy of software or data may be stored. Applications and resources may be stored in the mass memory and transferred to the main memory during run time. The mass memory may also include ROM (read only memory), EPROM (erasable, programmable ROM), EEPROM (electrically erasable, programmable ROM).

A user interfaces with the computer system with one or more input devices, such as a keyboard, a mouse, a stylus, or any other input device and views results through a display. A network interface is provided for communicating through a network with remote resources. The remote resources may include servers, remote storage devices, data warehouses, or any other remote device capable of interacting with the computer system.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A computer-readable storage medium encoded with instructions for directing a user to create a website using website creation software, the computer-readable storage medium comprising:
   instructions for displaying a base interface, the base interface comprising:
      a plurality of interface elements, wherein each interface element corresponds to a tool for accomplishing a task related to building a website,
      and
      a quick step interface element capable of toggling between an active state and an inactive state when selected by the user;
   instructions for displaying, responsive to a toggling of the quick step interface element to the active state, a first designator on top of the base interface to indicate to the user a first interface element of the plurality of interface elements to select in order to access a tool for accomplishing a first task of a plurality of basic tasks related to building a website, wherein the first task is to be completed by the user prior to completion of any other task of the plurality of basic tasks;
   instructions for updating, responsive to a completion, by the user, of the first task of the plurality of basic tasks related to building a website, the display of the first designator to indicate to the user a second interface element of the plurality of interface elements to select in order to access a tool for accomplishing a second task of the plurality of basic tasks related to building a website, wherein the second task is to be completed by the user subsequent to completion of the first task and prior to the completion of at least one task of the plurality of basic tasks; and
   instructions for removing the first designator from on top of the base interface responsive to a toggling of the quick step interface element to the inactive state, wherein the base interface remains displayed and the user may subsequently select the quick step interface element and each of the plurality of interface elements.

2. The computer-readable storage medium of claim 1, wherein the first designator surrounds at least one of the plurality of interface elements.

3. The computer readable storage medium of claim 1, wherein
   the base interface comprises a first background color,
   the first designator comprises a second background color, and
   the first background color is different from the second background color.

4. The computer readable storage medium of claim 1, wherein the first designator comprises textual instructions to the user.

5. The computer readable storage medium of claim 1, wherein at least one of the plurality of interface elements corresponds to a tool for accomplishing a task that is not one of the plurality of basic tasks related to building a website.

6. The computer readable storage medium of claim 1, further comprising:
   instructions for displaying, responsive to a selection by the user of a website type interface element of the base interface, a list of website types which can be created by the user; and
   instructions for determining, responsive to a selection by the user of a website type from the list of website types, which tasks are included in the plurality of basic tasks related to building a website.

7. The computer-readable storage medium of claim 6, wherein the website type interface element and the quick step interface element are a single interface element.

8. The computer readable storage medium of claim 6, wherein the list of website types comprises: a trial website, a form, and an e-commerce website.

9. The computer-readable storage medium of claim 1 further comprising:
   instructions for displaying, responsive to a selection of the first interface element, a tool for accomplishing the first task of the plurality of basic tasks related to building a website, the tool comprising a plurality of tool elements;
   instructions for displaying, when the quick step interface element is in the active state, a second designator on top of the tool to indicate a first tool element of the plurality of tool elements to select in order to accomplish a first sub-task of a plurality of sub-tasks related to the first task;
   instructions for updating, responsive to a completion of the first subtask by the user, the second designator to indicate to the user a second tool element of the plurality of tool elements to select in order to accomplish a second sub-task of the plurality of sub-tasks related to the first task;
   instructions for removing the second designator from on top of the tool, responsive to toggling of the quick step interface element to the inactive state; and
   instructions for removing the second designator from on top of the tool, responsive to the completion by the user of the first task.

10. A method for guiding a user through a process of building a website using an interface, the method encoded on a computer-readable medium of a computational apparatus, the method comprising:
   displaying a base interface, the base interface comprising:
      a plurality of interface elements, wherein each interface element corresponds to a tool for accomplishing a task related to building a website,
      and
      a quick step interface element capable of toggling between an active state and an inactive state when selected by the user;
   displaying, responsive to a toggling of the quick step interface element to the active state, a first designator on top of the base interface to indicate to the user a first interface element of the plurality of interface elements to select in order to access a tool for accomplishing a first task of a plurality of basic tasks related to building a website, wherein the first task is to be completed by the user prior to completion of any other task of the plurality of basic tasks;

updating, responsive to a completion, by the user, of the first task of the plurality of basic tasks related to building a website, the display of the first designator to indicate to the user a second interface element of the plurality of interface elements to select in order to access a tool for accomplishing a second task of the plurality of basic tasks related to building a website, wherein the second task is to be completed by the user subsequent to completion of the first task and prior to the completion of at least one task of the plurality of basic tasks; and removing the first designator from on top of the base interface responsive to a toggling of the quick step interface element to the inactive state, wherein the base interface remains displayed and the user may subsequently select the quick step interface element and each of the plurality of interface elements.

11. The method of claim 10, wherein the first designator surrounds at least one of the plurality of interface elements.

12. The method of claim 10, wherein the first designator comprises textual instructions to the user.

13. The method of claim 10, wherein at least one of the plurality of interface elements corresponds to a tool for accomplishing a task that is not one of the plurality of basic tasks related to building a website.

14. The method of claim 10 further comprising:
displaying, responsive to a selection by the user of a website type interface element of the base interface, a list of website types which can be created by the user; and
determining, responsive to a selection by the user of a website type from the list of website types, which tasks are included in the plurality of basic tasks related to building a website.

15. The method of claim 14, wherein the website type interface element and the quick step interface element are a single interface element.

16. A computer-readable storage medium on which is embedded one or more computer programs, the one or more computer programs implementing a method for directing a user to build a website, the one or more computer programs comprising a set of instructions for:
displaying a base interface, the base interface comprising:
a plurality of interface elements, wherein each interface element corresponds to a tool for accomplishing a task related to building a website,
and
a quick step interface element capable of toggling between an active state and an inactive state when selected by the user;
displaying, responsive to a toggling of the quick step interface element to the active state, a first designator on top of the base interface to indicate to the user a first interface element of the plurality of interface elements to select in order to access a tool for accomplishing a first task of a plurality of basic tasks related to building a website, wherein the first task is to be completed by the user prior to completion of any other task of the plurality of basic tasks;
updating, responsive to a completion, by the user, of the first task of the plurality of basic tasks related to building a website, the display of the first designator to indicate to the user a second interface element of the plurality of interface elements to select in order to access a tool for accomplishing a second task of the plurality of basic tasks related to building a website, wherein the second task is to be completed by the user subsequent to completion of the first task and prior to the completion of at least one task of the plurality of basic tasks; and
removing the first designator from on top of the base interface, responsive to a toggling of the quick step interface element to the inactive state, wherein the base interface remains displayed and the user may subsequently select the quick step interface element and each of the plurality of interface elements.

17. The computer-readable storage medium of claim 16, wherein the first designator surrounds at least one of the plurality of interface elements.

18. The computer-readable storage medium of claim 16, wherein the first designator comprises textual instructions to the user.

19. The computer-readable storage medium of claim 16, wherein at least one of the plurality of interface elements corresponds to a tool for accomplishing a task that is not one of the plurality of basic tasks related to building a website.

20. The computer-readable storage medium of claim 16 further comprising instructions for:
displaying, responsive to a selection by the user of the quick step interface element of the base interface, a list of website types which can be created by the user; and
determining, responsive to a selection by the user of a website type from the list of website types, which tasks are included in the plurality of basic tasks related to building a website.

* * * * *